United States Patent
He et al.

(10) Patent No.: US 8,237,503 B2
(45) Date of Patent: Aug. 7, 2012

(54) OUTPUT STAGE FOR A DIGITAL RF TRANSMITTER, METHOD FOR PROVIDING AN RF OUTPUT SIGNAL IN A DIGITAL RF TRANSMITTER, AND DIGITAL RF TRANSMITTER

(75) Inventors: Xin He, Waalre (NL); Manel Collados Asensio, Eindhoven (NL); Nenad Pavlovic, Eindhoven (NL); Jan Van Sinderen, Liempde (NL)

(73) Assignee: NXP B.V., Eindhoven (NL)

( * ) Notice: Subject to any disclaimer, the term of this patent is extended or adjusted under 35 U.S.C. 154(b) by 7 days.

(21) Appl. No.: 12/921,572

(22) PCT Filed: Mar. 9, 2009

(86) PCT No.: PCT/IB2009/050960
§ 371 (c)(1),
(2), (4) Date: Sep. 9, 2010

(87) PCT Pub. No.: WO2009/113000
PCT Pub. Date: Sep. 17, 2009

(65) Prior Publication Data
US 2011/0050344 A1   Mar. 3, 2011

(30) Foreign Application Priority Data
Mar. 10, 2008 (EP) ..................... 08102451

(51) Int. Cl.
*H03F 3/26* (2006.01)
(52) U.S. Cl. ........ 330/276; 330/51; 330/124 R; 330/295
(58) Field of Classification Search ........... 330/51, 330/276, 190, 124 R, 295, 286
See application file for complete search history.

(56) References Cited

U.S. PATENT DOCUMENTS

| | | | |
|---|---|---|---|
| 4,580,111 | A | 4/1986 | Swanson |
| 6,201,452 | B1 | 3/2001 | Dent et al. |
| 6,294,955 | B1 | 9/2001 | Luu et al. |
| 6,480,465 | B1 | 11/2002 | Luu |

(Continued)

FOREIGN PATENT DOCUMENTS
WO    2004/034570 A1    4/2004

OTHER PUBLICATIONS
Aoki, I., et al. "Distributed Active Transformer—A New Power-Combining and Impedance-Transformation Technique," IEEE Trans. on Microwave Theory and Techns., vol. 50, No. 1 (Jan. 2002).

(Continued)

*Primary Examiner* — Hieu Nguyen

(57) ABSTRACT

An output stage (1) for a digital RF transmitter is provided. The output stage comprises: an input adapted to receive an input signal (RFin, b7-b0) to be transmitted; a plurality N of power amplification sections (S1, S2, S3, S4); and an output (A, B) providing an output voltage signal. Each of the N power amplification sections (S1, S2, S3, S4) is arranged to receive the input signal (RFin, b7-b0) and comprises a transformer (T1, T2, T3, T4) adapted to provide a respective output signal. Each transformer comprises a primary stage and a secondary stage; the secondary stages of the transformers (T1, T2, T3, T4) of the N power amplification sections (S1, S2, S3, S4) are combined such that a combined output voltage signal of the output stage is provided. The N power amplification sections (S1, S2, S3, S4) are adapted such that the input signal (RFin, b7-b0) is latched by clock signals (clock1, clock2, clock3, clock4) comprising different phases.

14 Claims, 3 Drawing Sheets

U.S. PATENT DOCUMENTS 7,834,686 B2 * 11/2010 Staszewski et al. .............. 330/51

OTHER PUBLICATIONS

Zhou, Y., et al "A 10-Bit Wide-Band CMOS Direct Digital RF Amplitude Modulator," IEEE J. of Solid State Circuits, vol. 38, No. 7, pp. 1182-88 (Jul. 2003).

Eloranta, P., et al "Direct-Digital RF Modulator IC in 0.13 μm CMOS for Wide-Band Multi-Radio Applications," 2005 IEEE Int'l. Solid-State Circuits Conf., Session 29.2, 3 pgs. (2005).

Staszewski, R. B., et al "All-Digital PLL and GSM/Edge Transmitter in 90 nm CMOS," 2005 IEEE Int'l. Solid-State Circuits Conf., Session 17.5, 3 pgs. (Feb. 2005).

Liu, G., et al "A 1.2V, 2.4 GHz Fully Integrated Linear CMOS Power Amplifier with Efficiency Enhancement," IEEE 2006 Custom Integrated Circuits Conf., 4 pgs. (2006).

Shameli, A., et al "A Novel DAC Based Switching Power Amplifier for Polar Transmitter," IEEE 2006 Custom Integrated Circuits Conf., 4 pgs. (2006).

Van Zeijl, P., et al "A Multi-Standard Digital Envelope Modulator for Polar Transmitters in 90nm CMOS," 2007 IEEE Radio Frequency Integrated Circuits Symp., pp. 373-376 (2007).

Kavousian, A., et al "A Digitally Modulated Polar CMOS PA with 20MHz Signal BW," 2007 IEEE Int'l. Solid-State Circuits Conf., Session 4.1, 3 pgs. (2007).

Jerng, A., et al "A Wideband ΔΣ Digital-RF Modulator for High Data Rate Transmitters," IEEE J. of Solid State Circuits, vol. 42, No. 8; pp. 1710-1722 (Aug. 2007).

International Search Report and Written Opinion for Int'l. patent appln. No. PCT/IB2009/050960 (Sep. 14, 2009).

* cited by examiner

OUTPUT STAGE FOR A DIGITAL RF TRANSMITTER, METHOD FOR PROVIDING AN RF OUTPUT SIGNAL IN A DIGITAL RF TRANSMITTER, AND DIGITAL RF TRANSMITTER

FIELD OF THE INVENTION

The invention relates to an output stage for a digital RF transmitter, to a method for providing an RF output signal in a digital RF transmitter, and to a digital RF transmitter. More general, the present invention relates to the field of wireless data conversion. More specifically, it relates to the field of digital RF transmitters, which can e.g. be used for transmitting data in wireless communication systems.

BACKGROUND OF THE INVENTION

In recent years, an increased demand for higher data-rate wireless communications has arisen. This demand has led to the widespread adoption of non-constant envelope modulation which presents higher spectrum efficiency for data transmission. Conventional systems applying non-constant envelope modulation require use of linear power amplifiers (PAs). However, the power efficiency of linear power amplifiers is still low as compared to non-linear power amplifiers. Thus, in mobile applications this shortens the battery life. In order to improve amplifier efficiency and reduce costs and, at the same time, achieve the required level of linearity, various linearization techniques have been developed. These techniques include e.g. Cartesian loop architecture, pre-distortion, and feed-forward techniques. However, the efficiency of these techniques remains limited due to the use of linear power amplifiers.

In view of this, the more ambitious way for achieving improved power efficiency is to use polar loop technique or LINC (Linear Amplification by Nonlinear Components) in which non-linear power amplifiers are employed and thus higher power efficiency can be achieved. However, with such a technique as well, problems occur which will be described in the following.

For example, a polar transmitter comprises two paths to process the phase signal and the amplitude signal independently. Further, for processing the amplitude signal two types of amplitude modulation (AM) can be found, namely i) supply modulation and ii) direct envelope modulation. Now, the problems occurring with respect to these two different types of amplitude modulation will be described.

i) A polar loop with supply modulation may be formed as shown in FIG. 1, for example. In the phase path, a VCO (voltage-controlled oscillator) modulated by the phase signal feeds the input of a non-linear power amplifier (non-linear PA). In the amplitude path, simultaneously the power supply of the non-linear power amplifier is modulated by the amplitude signal by use of a DC-DC converter. In this arrangement, phase and amplitude information are independently processed but digitally synchronized. As a consequence, both signals can be transmitted without sacrificing performance parameters. However, in practice the bandwidth of the DC-DC converter in the amplitude path is limited. Further, in the amplitude modulation path, spectrum re-growth occurs which leads to a much larger bandwidth than that of the desired RF output signal. Due to this, such an arrangement using the DC-DC converter is only suitable to standards for data transmission with a very narrow bandwidth, such as GSM and EDGE standards. A possible way to cope with this problem is to use a linear regulator instead of the DC-DC converter or a combination of DC-DC converter and linear regulator. However, this leads to a reduction in power efficiency.

ii) On the other hand, a polar transmitter with direct envelope modulation can e.g. be formed as shown in FIG. 2. Such a polar transmitter has been disclosed by van Zeijl and Collados in "A Multi-Standard Digital Envelope Modulator for Polar Transmitters in 90 nm CMOS", RFIC Symposium, 2007 (reference [1]). The polar transmitter of FIG. 2 comprises a binary weighted transistor array having a lower row of transistors and an upper row of cascode transistors. The binary weighting of the respective transistors is indicated by the numbers (1, 2, 4, 8, . . . ). In this example, the gates of the transistors in the lower row of transistors are driven by a phase-modulated signal RF input. The bias of the gate of the respective transistors determines the current flowing in the respective unit. The cascode transistors in the upper row are controlled by signals b0 to b7. Depending on the signals b0 to b7, the cascode transistors switch on/off the phase-modulated current from the lower row of transistors. As a result, envelope information and phase information are combined at the RF output. Similar approaches adopting different unit cell configurations can be found. Such a direct digitally envelope-modulated polar transmitter overcomes the bandwidth limit which has been described above with respect to supply modulation technique. As a consequence, such a polar transmitter is suitable for software-defined radio (SDR). However, in real implementation a problem occurs that the binary weighted array cannot guarantee a monotonic output current. This is due to an inevitable mismatch of the employed transistors.

In order to overcome this problem, for direct digitally envelope-modulated polar RF transmitters it has been proposed to employ a thermometer-decoded unit matrix in which each unit cell has the same configuration and is switched on and off by decoding the binary data. This is also disclosed by van Zeijl and Collados in the above reference [1].

In this context, it should be noted that the digitally envelope-modulated polar RF amplifier is essentially a digital-to-RF power converter. The discrete-time to continuous-time conversion introduces spectral image at the offset of the sampling clock and its higher order harmonics. This may violate the spectral mask and the constraints with respect to out-of-band emissions. There are two principles which can be exploited to suppress these unwanted spurs; on the one hand, the sampling frequency can be increased and the input can be interpolated and, on the other hand, the output of the amplifier can be filtered. However, filtering the output requires an extra LC tank and frequency tuning. Thus, for on-chip integration this is disadvantageous because it results in large chip area and complex circuitry.

As a consequence, N-fold linear interpolation combined with over-sampling is more preferred. In reference [1], four-fold linear interpolation is established for thermometer-coded envelope-modulated polar amplifiers by splitting the output stage into four parallel unit matrixes which are sequentially switched by four quadrature-phased sampling clocks.

Further, recently the direct digital RF modulator approach has been proposed for RF transmitters. According to this approach, the digital-analog converter (DAC) and the up-conversion mixer are combined to a common unit. A possible implementation of this approach has been disclosed by Jerng and Sodini in "A Wideband Digital-RF Modulator for High Data Rate Transmitters", IEEE Journal of Solid-State Circuits, Vol. 42, No. 8, August 2007 (reference [2]). However, in this approach similar problems with respect to the image spectrum occur as in the direct envelope modulator. Thus, also according to this approach input interpolation or RF filtering is needed to lower the spur level. Again, input interpolation is preferred due to the features explained above.

To summarize, to suppress the spectral image introduced in a digitally envelope-modulated polar RF amplifier or in a direct digital RF modulator, oversampling and input interpolation is favored. However, in the known concepts for input interpolation, adopting input interpolation nearly quadruples the size of the output stage, since the size of the unit cell is dominated by the local decoding logic inside the unit. In particular, as more bits are needed in UMTS or other standards, the total size of the output stage may exceed the inductor size when the output matching network is integrated in chip. As a consequence, the operating frequency is limited.

OBJECT AND SUMMARY OF THE INVENTION

It is an object of the present invention to provide an output stage for a digital RF transmitter, a method for providing an RF output signal in a digital RF transmitter, and a digital RF transmitter with which input interpolation is possible with reduced size of sections of the output stage and with which the maximum operating frequency can be enhanced. Further, the overall power efficiency shall be improved.

This object is attained by an output stage for a digital RF transmitter according to claim 1. The output stage comprises: an input adapted to receive an input signal to be transmitted; a plurality N of power amplification sections; and an output providing an output voltage signal. Each of the N power amplification sections is arranged to receive the input signal and comprises a transformer adapted to provide a respective output signal, each transformer comprising a primary stage and a secondary stage. The secondary stages of the transformers of the N power amplification sections are combined such that a combined output voltage signal of the output stage is provided. The N power amplification sections are adapted such that the input signal is latched by clock signals comprising different phases. In this context, the term input signal covers both unary and binary RF envelope data. Since each of the N power amplification sections comprises a transformer providing the respective output voltage signal, instead of summing output currents employed in conventional approaches, the output voltage can be stacked. In each power amplification section, the size of the unit array can be much smaller than the transformer size. As a result, the maximum operating frequency is enhanced. Since the input signal is latched by clock signals comprising different phases in the N power amplification sections, the output voltage swing is evenly distributed in N sections, resulting in a lower voltage swing in each section. Therefore, it is possible to use thin oxide transistors to achieve high power efficiency at high output power such that the need for an external power amplifier is eliminated.

Preferably, the N power amplification sections are arranged such that interpolation of the input signal is provided. Thus, introduced spectral image can be suppressed conveniently.

Preferably, secondary stages of the transformers of the N power amplification sections are connected in series. In this case, transformer-based power combing is achieved and, thus, power combing with additional power interpolation is realized by the output stage.

According to an aspect, at least one of the N power amplification sections is provided with a switch structure capable of switching the respective output signal of that section on and off. As a result, the power efficiency of the output stage can be improved, since the amplifier can be controlled to operate at peak efficiency over a large power range by turning on/off each section.

If the output stage is adapted such that the output signal of at least one of the N power amplification sections is switched on and off depending on the output power level, the output stage provides peak efficiency for a wide power range without necessitating further measures.

The object is further attained by a method for providing an RF output signal in a digital RF transmitter according to claim 6. The method comprises the steps: applying an input signal at a plurality N of power amplification sections of an output stage; latching the input signal by clock signals comprising different phases in the plurality N of power amplification sections; applying respective RF output signals of the plurality N of power amplification sections to corresponding transformers, and combining secondary stages of the transformers of the N power amplification sections such that a combined output voltage signal of the output stage is provided. Since the RF output signals of the N power amplification sections are each provided to a transformer, instead of summing output currents employed in conventional approaches, the output voltage can be stacked. In each power amplification section, the size of the unit array can be much smaller than the transformer size, thus enhancing the maximum operating frequency. Since the input signal is latched by clock signals comprising different phases in N power amplification sections, the output voltage swing is evenly distributed in N sections, resulting in a lower voltage swing in each section. Therefore, it is possible to use thin oxide transistors to achieve high power efficiency at high output power such that the need for an external power amplifier is eliminated.

If the secondary stages of the transformers are connected in series, power combing with additional power interpolation is achieved in a convenient way.

Preferably, at least one of the plurality of power amplification sections is switched on and off depending on the output power level. In this case, the average power efficiency is improved, since the amplifier can operate at peak efficiency over a large power range.

The object is further attained by a digital RF transmitter according to claim 9.

Further features and advantages of the invention will become apparent from detailed description with reference to the Figures.

BRIEF DESCRIPTION OF THE DRAWINGS

Embodiments of the invention will be described in greater detail hereinafter, by way of non-limiting examples, and with reference to the drawings.

DESCRIPTION OF EMBODIMENTS

An embodiment of the invention will now be described with respect to FIGS. 3 to 5. According to the embodiment, the output stage 1 comprises four power amplification sections S1, S2, S3, and S4 (i.e. N=4 in the present embodiment). It should be noted that the invention is not limited to N=4 and other numbers are possible as well. However, N>2 is preferred and N>3 is more preferred. Each of the power amplification sections S1, S2, S3, and S4 is formed by a thermometer-coded envelope-modulated polar amplifier. In the following, the functioning of this thermometer-coded envelope-modulated polar amplifier will be described with reference to FIGS. 4 and 5 for the power amplification section S1.

Figure 1:
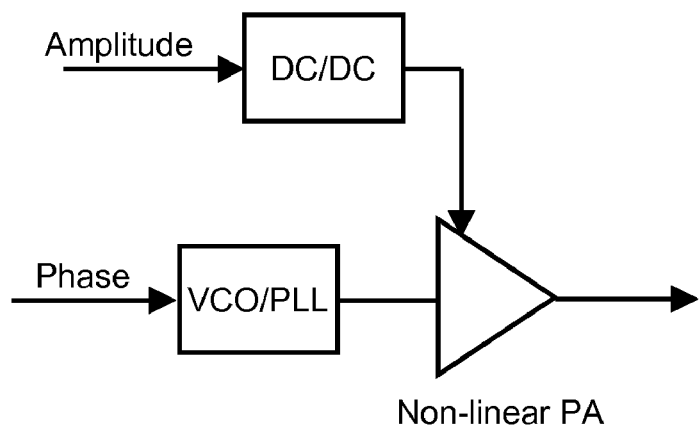
FIG. 1 schematically shows a prior art polar transmitter with supply modulation.
Figure 2:
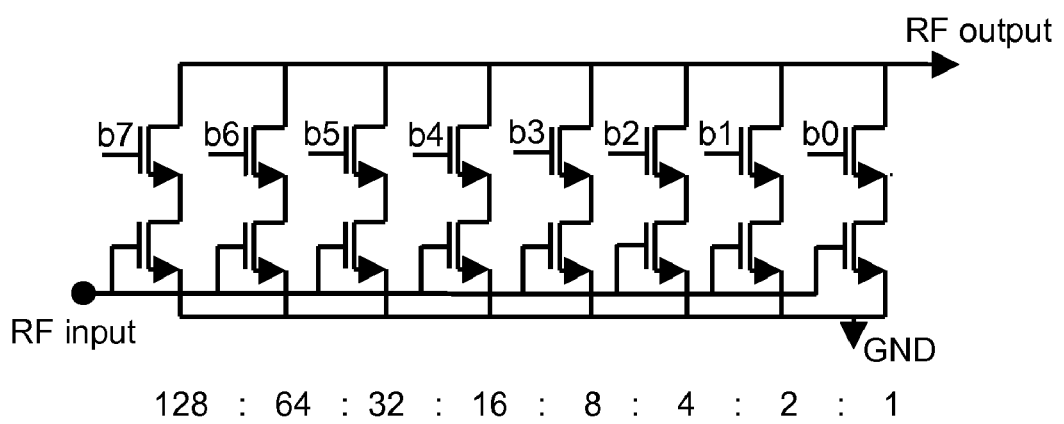
FIG. 2 schematically shows the binary weighted envelope-modulated amplifier as disclosed in reference [1].
Figure 3:
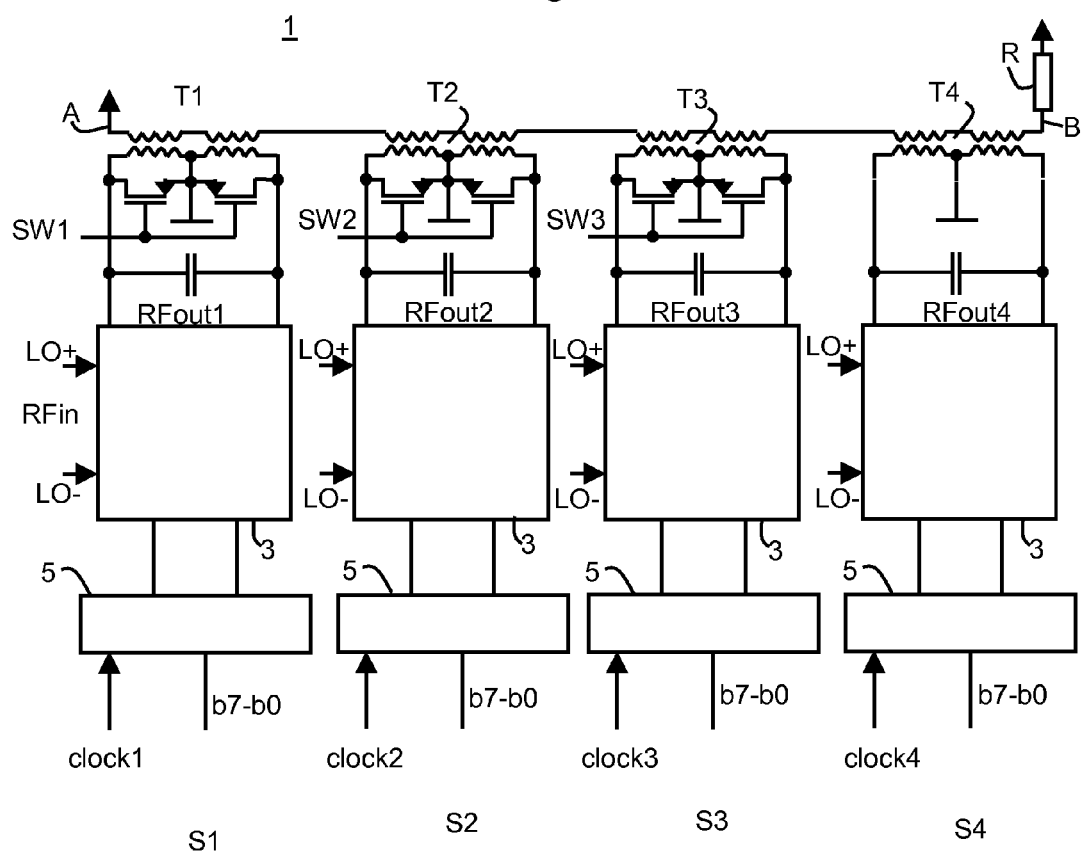
FIG. 3 schematically shows the output stage for a digital RF transmitter according to an embodiment.
Figure 4:
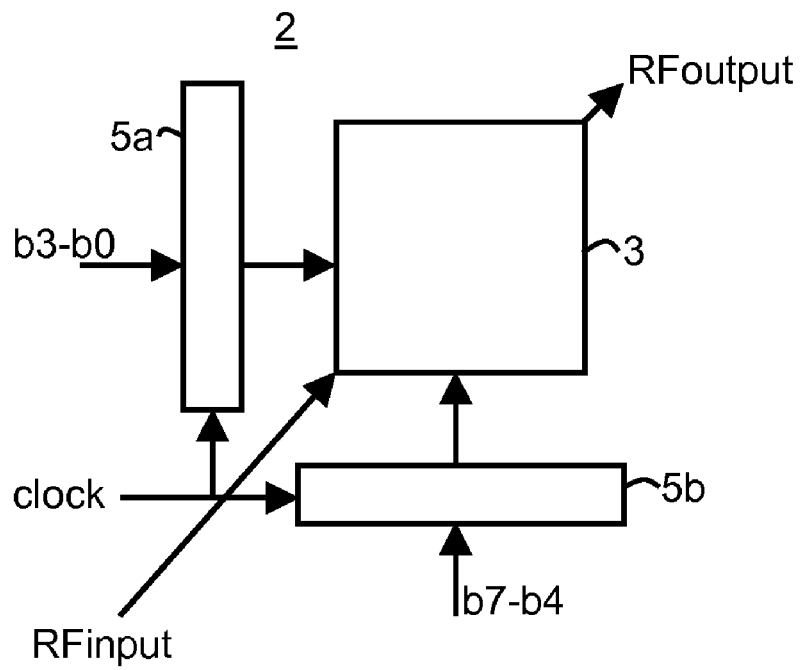
FIG. 4 schematically shows the block diagram of the thermometer-coded envelope modulated polar amplifiers which are used in the embodiment.
Figure 5:
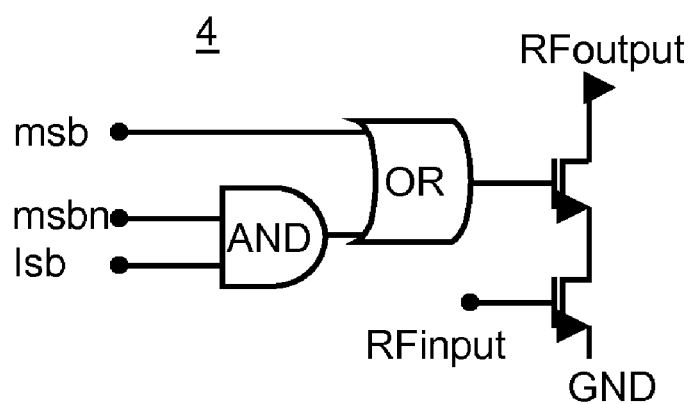
FIG. 5 schematically shows one unit cell of the polar amplifier shown in FIG. 4.

As shown in FIGS. 4 and 5, the thermometer-coded envelope-modulated polar amplifier 2 comprises a unit array 3 which in the present embodiment has 256 (16×16) unit cells 4 arranged in 16 rows and 16 columns. Thus, the polar amplifier 2 is adapted for 8-bit data. A skilled person will understand that the embodiment is not restricted to 8-bit data and that the polar amplifier 2 can be easily adapted to other bit numbers. The structure of these unit cells 4 is shown in FIG. 5. Further, the polar amplifier 2 comprises two binary-to-thermometer decoders 5*a* and 5*b*. For reasons of intelligibility, the decoders 5*a* and 5*b* are shown as one block 5 in FIG. 3. One binary-to-thermometer decoder 5*a* receives the four least significant bits b3, b2, b1, and b0 and is allocated to the 16 rows of the unit array 3, while the other binary-to-thermometer decoder 5*b* receives the four most significant bits b7, b6, b5, b4 and is allocated to the 16 columns of the unit array 3. The binary-to-thermometer decoders 5*a* and 5*b* are clocked by the same clock signal (clock). Further, the unit array 3 receives the RF input signal (RF input) and outputs the modulated RF output signal (RF output). For modulation, each unit cell 4 of the unit array 3 is switched on or off by decoding the binary data b7-b0. The functioning of such a thermometer-coded envelope-modulated polar amplifier 2 and its unit cells 4 is disclosed in reference [1], for example, and will not be described in detail again. However, it should be noted that the thermometer-coded envelope-modulated polar amplifier 2 is operated depending on a clock signal indicated as "clock" in FIG. 4. Though a specific type of thermometer-coded envelope-modulated polar amplifier 2 is disclosed, other types are possible as well without departing from the spirit of the invention.

In the output stage 1 according to the embodiment shown in FIG. 3, each power amplification section S1 to S4 comprises such a thermometer-coded envelope-modulated polar amplifier 2. It should be noted that in FIG. 3 both the phase modulated RF input signal (LO input) and the RF output from each section S1-S4 are shown in a differential way (applied between two terminals each). The polar amplifiers 2 of the respective power amplification sections S1-S4 receive the same binary data b7-b0 and the same phase-modulated RF input signal applied between the respective input terminals LO+ and LO− shown in FIG. 3 as input signals. However, the polar amplifiers 2 of the respective power amplification sections S1-S4 are driven by four phased clocks clock1-clock4. In the embodiment shown, the polar amplifiers are driven by quadrature-phased clocks.

In the specific embodiment, the sampling clock clock1 applied to power amplification section S1 has a phase of zero degrees. The sampling clock clock2 applied to power amplification section S2 comprises a phase shift of 90 degrees with respect to clock1, the sampling clock clock3 applied to power amplification section S3 comprises a phase shift of 180 degrees with respect to clock1, and the sampling clock clock4 applied to power amplification section S4 comprises a phase shift of 270 degrees with respect to clock1. Thus, in the embodiment the phases of the respective clock signals clock1-clock4 are evenly distributed over 360 degrees. Though this is preferred, the invention is not limited to an even distribution and other phase differences between the different clocks are possible.

Thus, each of the power amplification sections S1-S4 processes the RF input signal and the binary data b7-b0 but driven by clock signals having the same frequency but different phase relations. As a result of this processing, the unit array 3 of power amplification section S1 outputs an output signal RFout1, the unit array 3 of power amplification section S2 outputs an output signal RFout2, the unit array 3 of power amplification section S3 outputs an output signal RFout3, and the unit array 3 of power amplification section S4 outputs an output signal RFout4. As can be seen in FIG. 3, each power amplification section S1-S4 is provided with a transformer T1, T2, T3, and T4, respectively. The respective output signals RFout1-RFout4 are applied to the primary stages of the respective transformers T1-T4. The secondary stages of the transformers T1-T4 are connected in series such that the output voltages from the secondary stages of the power amplification sections S1-S4 are stacked to provide an output voltage of the output stage 1. The terminals between which the output voltage of the output stage 1 is provided are indicated by A and B in FIG. 3. Further, FIG. 3 shows a load R applied to the output of the output stage 1 which may be a 50 Ohm resistance, for example.

Thus, according to the embodiment, N transformers are used to combine the outputs from N power amplification sections S1, . . . , SN. As a result, transformer-based power interpolating is achieved according to a new concept of power combing with additional power interpolation.

For the power amplification sections S1, . . . , SN differential amplifiers in System on Chip (SOC) are preferred because in this case the injection to the substrate is significantly suppressed and the even order harmonics are reduced. It is an additional advantage of the transformer-based power combing that the transformer itself can be configured as a wideband balun with tuned capacitors.

To summarize, according to the disclosed embodiment, the output stage is split into N sections. Each section comprises one equivalent unit cell matrix and one transformer load, while the data are latched by one of the N phased clocks. Instead of summing output currents employed in conventional approaches, the output voltage is stacked from the secondary stages of the N transformers. As a consequence, in each section the size of the unit cell matrix can be much smaller than the transformer size which results in an enhanced maximum operating frequency. Moreover, the voltage swing is evenly distributed in four sections with transformer power combing which results in a lower voltage swing in one section. As a result of this, it is possible to use thin oxide transistors to achieve high power efficiency at high output power which eliminates the need for an external power amplification stage. Still further, due to the reduced size enabled by using thin oxide transistors, the parasitic capacitance at the output is also reduced which leads to a wider operating frequency range.

It should be noted that the invention is not limited to digitally envelope-modulated polar RF amplifiers as described above but application to direct RF modulators is possible as well. In this case, N power amplification sections of the direct RF modulator are arranged in parallel as in the embodiment above. These N sections are driven by N phased clocks and the outputs of the respective sections are combined using N transformers as in the embodiment described above.

A further feature of the embodiment will now be described with respect to FIG. 3. It should be noted that in theory the spectrum image rejection can be improved by increasing the stages of N-fold interpolation. On the other hand, the image spurs may only violate the spectrum mask at high output power. Therefore, the embodiment enables configuring the number of interpolation stages depending on the output power level, as will be described in the following.

As can be seen in FIG. 3, the output portions of the power amplification sections S1, S2, and S3 are each provided with an additional switch structure which can be used to switch on/off the respective power amplification section S1, S2, or S3. In the embodiment, the switch structure is formed by two transistors the gates of which are controlled by switch signals SW1, SW2, and SW3, respectively. These transistors can e.g. be formed by PMOS transistors. I.e. in the power amplification section S1, the gates of both transistors of the switch structure are controlled by SW1; in section S2 the respective gates are controlled by SW2, etc. If the respective switch signal SW1, SW2, or SW3 has a value corresponding to "1" (or "OFF"), the two transistors of the corresponding power amplification section S1, S2, or S3 are turned off and, thus, the respective power amplification section is turned on. The transistors can be properly sized such that their presence does not degrade the power efficiency. On the other hand, if the respective switch signal SW1, SW2, or SW3 has a value corresponding to "0" (or "ON"), the corresponding transistors are turned on, yielding a low impedance at the primary stage of the transformer. I.e. the output terminals of the unit array 3 are connected via the two transistors. As a result, the corresponding power amplification section S1, S2, or S3 is turned off and the corresponding secondary stage of the transformer does not receive any output voltage signal from the primary stage.

The output stage 1 according to the embodiment is implemented such that the power amplification sections S1, S2, and S3 can be independently switched on and off by the respective switch signals SW1, SW2, and SW3. Further, preferably one of the N power amplification sections does not comprise a switch structure, as shown for the power amplification section S4 in FIG. 3. This further improves the power efficiency of the output stage.

Now, operation of the switch structures in the output stage 1 of FIG. 3 will be described. For example in the output stage 1 comprising four power amplification sections (N=4), if two power amplification sections (e.g. S1 and S3) are turned off, the four-fold interpolation amplifier turns into a two-fold interpolation amplifier. If three power amplification sections (S1 to S3) are turned off, there will not be any interpolation (which may be sufficient for low power output. It should be noted that the number of power amplification sections which can be turned on or off is not limited to the number described above and different numbers are possible depending on the number N of power amplification sections.

According to the embodiment, the switch signals SW1, SW2, and SW3 are controlled such that the number of power amplification sections Si is selected based on the required output power level. To this end, a control unit which is appropriately adapted is provided. The benefit of configuring different numbers of interpolation stages at different power levels is that the average power efficiency can be improved since the amplifier can operate at peak efficiency over a large power range by turning on/off each section. This means, if only a low output power level is required, the output stage 1 operates with only one power amplification section, S4 in the embodiment, and if the highest output power level is required, all N power amplification units are switched on and N-fold interpolation is provided. For intermediate output power levels, an intermediate number of power amplification units is switched on.

Further, baseband processing, receiver, and polar transmitter can be integrated such that the printed circuit board (PCB) area is reduced and the System on Chip (SOC) costs are decreased in software-defined radio (SDR) applications.

Thus, it is proposed to use transformer-based power interpolating for both digital envelope modulator and digital IQ modulator.

The described switch structure can also be applied to direct digital RF modulators.

The invention claimed is:

1. An output stage for a digital RF transmitter comprising:
    an input adapted to receive an input signal to be transmitted;
    a plurality N of power amplification sections; and
    an output providing an output voltage signal;
    wherein each of the N power amplification sections is arranged to receive the input signal and comprises a transformer adapted to provide a respective output signal, each transformer comprising a primary stage and a secondary stage;
    wherein the secondary stages of the transformers of the N power amplification sections are combined such that a combined output voltage signal of the output stage is provided; and
    wherein each of the N power amplification sections is configured to receive same binary data and a clock signal having a different phase via a respective decoder, wherein each respective decoder includes a row decoder and a column decoder.

2. The output stage according to claim 1, wherein the N power amplification sections are arranged such that interpolation of the input signal is provided.

3. The output stage according to claim 1, wherein secondary stages of the transformers of the N power amplification sections are connected in series.

4. The output stage according to claim 1, wherein at least one of the N power amplification sections is provided with a switch structure capable of switching the respective output signal of that section on and off.

5. The output stage according to claim 1, wherein the output stage is adapted such that the output signal of at least one of the N power amplification sections is switched on and off depending on the overall output power level of the output stage.

6. A digital RF transmitter comprising an output stage according to claim 1.

7. The output stage of claim 1, wherein the row decoder is configured to receive a set of the least significant bits of the binary data and the column decoder is configured to receive a set of the most significant bits of the binary data.

8. The output stage of claim 1, wherein the row decoder and the column decoder are clocked by the same clock signal.

9. The output stage of claim 1, wherein each of the N power amplification sections includes a unit array comprising a plurality of unit cells, and wherein each of the plurality of unit cells is switched on or off by decoding the same binary data using each respective decoder.

10. The output stage of claim 1, wherein clock signals of the N power amplification sections are evenly distributed over 360 degrees.

11. A method for providing an RF output signal in a digital RF transmitter, the method comprising the steps of:
    applying an input signal at a plurality N of power amplification sections of an output stage;
    latching the input signal by clock signals comprising different phases in the plurality N of power amplification sections, applying respective RF output signals of the plurality N of power amplification sections to corresponding transformers, and combining secondary stages of the transformers of the N power amplification sections such that a combined output voltage signal of the output stage is provided, wherein same binary data and a clock signal having a different phase are received at each of the N power amplification sections via a respective decoder, wherein each respective decoder includes a row decoder and a column decoder.

12. The method according to claim 11, wherein the secondary stages of the transformers are connected in series.

13. The method according to claim 11, wherein at least one of the plurality of power amplification sections is switched on and off depending on the output power level.

14. An output stage for a digital RF transmitter comprising:
an input adapted to receive an input signal to be transmitted;
a plurality N of power amplification sections; and
an output providing an output voltage signal;
wherein each of the N power amplification sections is arranged to receive the input signal and comprises a transformer adapted to provide a respective output signal, each transformer comprising a primary stage and a secondary stage;
wherein the secondary stages of the transformers of the N power amplification sections are combined such that a combined output voltage signal of the output stage is provided; and
wherein each of the N power amplification sections is configured to receive same binary data and a clock signal having a different phase via a respective decoder, wherein each of the N power amplification sections includes a unit array comprising a plurality of unit cells, and wherein each of the plurality of unit cells is switched on or off by decoding the same binary data using each respective decoder.

* * * * *